United States Patent [19]
Klapp

[11] Patent Number: 4,719,707
[45] Date of Patent: Jan. 19, 1988

[54] CONVEYING APPARATUS FOR A FLAT ARTICLE, PARTICULARLY A CARDBOARD BLANK, PAPER SHEETS OR SIGNATURES OR THE LIKE

[75] Inventor: Hartmut Klapp, Kaarst, Fed. Rep. of Germany

[73] Assignee: Jagenberg Aktiengesellschaft, Dusseldorf, Fed. Rep. of Germany

[21] Appl. No.: 875,982

[22] Filed: Jun. 18, 1986

[30] Foreign Application Priority Data

Jun. 19, 1985 [DE] Fed. Rep. of Germany ....... 3521842

[51] Int. Cl.$^4$ ............................................. F26B 13/06
[52] U.S. Cl. ............................................. 34/94; 34/39; 34/144; 34/146
[58] Field of Search ................ 34/39, 74, 94, 95, 144, 34/146, 123, 152, 162; 432/33; 156/497, 499, 581, 583.3; 493/129, 133, 141, 142, 148, 150, 189, 207, 332

[56] References Cited

U.S. PATENT DOCUMENTS

| | | | |
|---|---|---|---|
| 1,698,818 | 1/1929 | Lorenz | 34/123 |
| 1,949,917 | 3/1934 | Muench | 34/144 |
| 3,525,160 | 8/1970 | Dokoupil et al. | 34/95 |
| 4,202,721 | 5/1980 | Roberts | 493/189 |
| 4,353,776 | 10/1982 | Giulie et al. | 156/581 |
| 4,506,457 | 3/1985 | Lehtinen | 34/162 |
| 4,556,444 | 12/1985 | Schommler | 34/162 |

*Primary Examiner*—Albert J. Makay
*Assistant Examiner*—David W. Westphal
*Attorney, Agent, or Firm*—Karl F. Ross; Herbert Dubno

[57] ABSTRACT

The conveying apparatus for a flat article, particularly a cardboard blank, paper sheet or the like, comprises two driven endless belts running over guides positioned opposing each other between which the article is clamped during transport. The endless belts are guided on base surfaces of beds of the guides having a wavelike longitudinal cross section in the conveying direction with a plurality of wave troughs and peaks. A plurality of lateral supporting members are attached to each of the beds. The wave crests of one of the guides are positioned staggered with respect to the wave crests of the other guide and opposing the wave troughs of the other guide. Furthermore the endless belts are either elastic in the conveying direction or a tension provider is mounted engaging each of the endless belts.

11 Claims, 3 Drawing Figures

CONVEYING APPARATUS FOR A FLAT ARTICLE, PARTICULARLY A CARDBOARD BLANK, PAPER SHEETS OR SIGNATURES OR THE LIKE

FIELD OF THE INVENTION

My present invention relates to a conveying apparatus or transport mechanism for a flat article and more particularly, to a conveying apparatus for a cardboard blank, paper sheet or signature or the like. The invention also relates to a heat sealing apparatus provided with an improved conveyor.

BACKGROUND OF THE INVENTION

A conveying apparatus can comprise two driven endless belts circulating over guides between which a flat article is clamped during its travel or transport.

This conveying apparatus acts to hold the orientation of the flat article fixed during transport. Also it feeds the article to a definite predetermined position or to a particular work station or past a particular work station.

In one application a polyethylene (PE) layer container section or piece is conducted with its projecting edges passing heating devices which melt these edges so that the edges can be brought together and heat sealed to each other.

In this known conveying apparatus, the guides for each endless belt comprise spring supported rollers. The spring support guarantees that independent of the number of articles between both belts and independently of its thickness each article is held reliably in place. The bearing roller requires considerable space and are comparatively expensive to construct. Moreover this roller bearing mounting is temperature sensitive.

OBJECTS OF THE INVENTION

It is an object of my invention to provide an improved conveying apparatus for a flat article, particularly for a cardboard blank, a paper sheet, signature or the like.

It is an object of my invention to provide an improved conveying apparatus for a flat article which is simple in structure, occupies comparatively little space and is less temperature sensitive than the known conveying apparatus.

It is also an object of my invention to provide an improved heat sealing device for an article having a polyethylene layer.

SUMMARY OF THE INVENTION

These objects and others which will become more apparent hereinafter are attained in accordance with my invention in a conveying apparatus for a flat article, particularly a cardboard blank (e.g. a blank which can be formed into a carton, container or the like), paper sheet signature or the like, comprising two driven endless belts running over guides or bed positioned opposite each other and between which the flat article is clamped during transport.

According to my invention both of the guides have a base surface facing the endless belts which is formed as a bed with a wavelike longitudinal cross section with a plurality of wave troughs and crests. A plurality of lateral supporting members, ribs or ridges are attached to or formed on the beds. The wave crests of one of the guides are positioned staggered with respect to the wave crests of the other guide and opposing the wave troughs of the other guide so that they would interrupt if pushed together. The endless belts are either elastic in the transport direction or a belt-store engages the or each endless belts.

In the conveying apparatus according to my invention the guides are rigid whereby their construction expense compared to spring supported roller bearings is considerably reduced. Since no rotary parts, such as rollers, are necessary, these guides are temperature insensitive. Additionally according to one embodiment of my invention the guides are cooled. Of course the conveyor belts are also cooled by the same cooling. A cooling duct can be provided in the guides adjacent the base, a cooling medium being circulated through the duct or passage to provide the cooling.

My conveying apparatus is advantageously employed in a heat sealing machine for polyethylene (PE) layer pieces. Advantageously two conveying apparatuses according to my invention are positioned parallel to each other and immediately adjacent the edges of a polyethylene (PE) piece being transported through the conveying apparatuses is a heating unit, e.g. with gas burners, which melts the edges of the PE layer piece. The edges can then be brought together and sealed. In the resulting heat sealing machine there is no danger that the guides are heated to an injurious extent by the heating devices.

Two conveying units can be positioned parallel to each other and spaced from each other horizontally. Each of these conveying units comprises two driven endless belts running over two guides positioned opposite each other between which the flat article is clamped during transport through the conveying apparatus. The guides each have base surfaces facing the endless belts and formed on respective beds with a wavelike longitudinal cross section with a plurality of wave troughs and crests and a plurality of lateral supporting members attached to the bed and these guides are positioned with respect to each other so that the wave crests of one of the guides are positioned staggered with respect to the wave crests of the other of the guides and opposite the wave troughs of the other of the guides.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
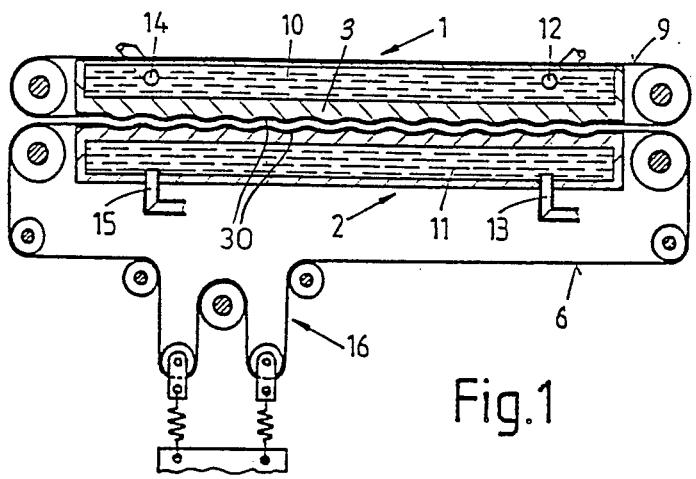
FIG. 1 is a schematic longitudinal cross sectional view of a conveying apparatus according to my invention.

The conveying apparatus shown in FIG. 1 for a flat article such as a blank of cardboard includes an upper guide 1 and a lower guide 2. The upper and the lower guides 1 and 2 have the same structure. Their structure is illustrated particularly well in FIG. 2 which shows a heat sealing machine in which they are used.

Each guide 1 or 2 comprises a bed 3 which is wave shaped in its longitudinal cross section taken in the transport direction. Lateral supporting members 4 and 5 are attached to the beds 3. Conveyor belt 6 is guided contacting base surface 30 of one bed 3 under tension over lower guide 2, while the conveyor belt 9 is guided on base surface 30 of the other bed 3 over the upper guide 1.

Figure 3:
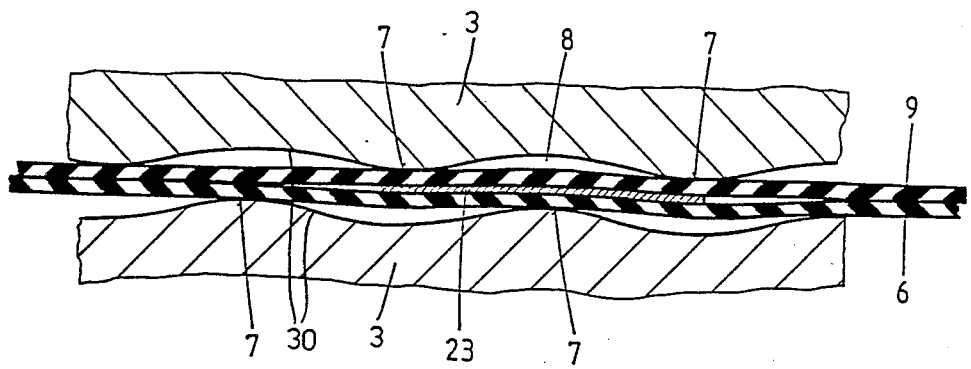
FIG. 3 is cutaway longitudinal cross section of a part of the apparatus of FIG. 1.

On account of the wave crests and troughs of the beds 3 and the tension in the conveyor belt 6 the guiding or contact of the conveyor belt 6 on base surface 30 is limited to the vicinity of the wave crests 7 as shown in FIG. 3. It is sufficient when the lateral supporting members 4 and 5 are present in the vicinity of the wave crests 7. As is also shown in FIG. 3 the wave crests 7 of one bed 3 are positioned opposite the wave troughs 8 of the other bed 3. Between each wave trough 8 and the conveyor belt 9 running near these wave troughs 8 one finds a space. This space allows the conveyor belt 9 under tension to yield or relax when a piece is guided between both belts 6 and 9 in the region between the wave crests 7 and wave troughs 8.

On the side of the beds 3 not contacting the belt 6 or 9 a cooling means 10 or 11—particularly a water conducting duct with corresponding inlet and outlet pipes 12 or 13 and 14 or 15—is provided.

Each endless conveyor belt 6 or 9 can run through a slack takeup or storage unit 16 which maintains the belt 6 or 9 under tension in the stretch along the bed and which also provides some give or flexibility as needed according to the conditions. A drive (not shown) can be provided for these conveyor belts 6 and 9.

Alternatively to the slack takeup unit 16, the belts may simply be resilient in the longitudinal direction as shown for the belt 9.

Figure 2:
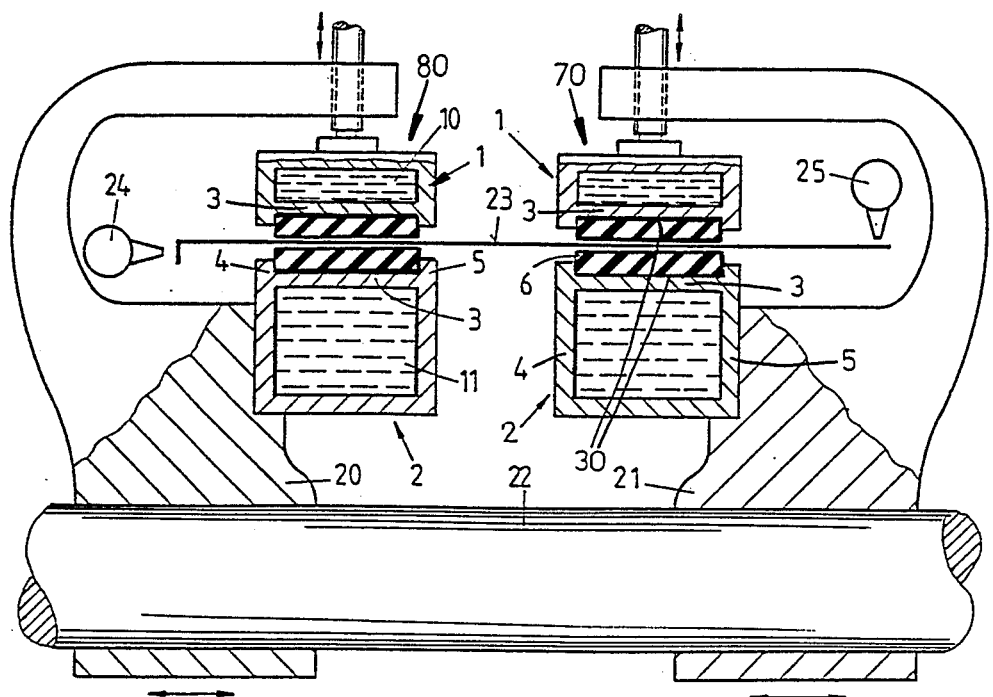
FIG. 2 is a transverse cross sectional view of two conveying apparatuses according to FIG. 1 positioned side by side in a machine for heat sealing the edges of PE (polyethylene) layer sheet.

In the arrangement shown in FIG. 2 two conveying units 80 and 90 according to my invention are positioned parallel to each other. The lower guides 2 of the conveying units 80 and 90 are mounted rigidly on supports 20 and 21, while the upper guides 1 are held by the supports 20 and 21 but the height of the upper guides 1 is adjustable. Furthermore the supports 20 and 21 are slidably mounted on a shaft 22 so that the conveying units may be positioned at different distances from each other according to the width of the piece or sheet being conveyed.

The machine shown in FIG. 2 heats (for subsequent heat sealing) a PE layer sheet or piece 23 with gas burners 24 and 25 when it is conveyed through the machine by the two conveying units 80 and 90.

The described conveying apparatus according to my invention for flat articles distinguishes itself from the known conveying units by its simple construction, its comparatively compact structure, its temperature insensitivity and its freedom from maintenance.

I claim:

1. In a conveying apparatus for a flat article having a plastic coating, particularly a cardboard blank, paper sheet or the like, comprising two driven endless belts running over guides positioned opposite each other between which said flat article is clamped during transport through said conveying apparatus, said guides extending substantially the full length of a path of said belts between rollers at which said belts are deflected from said path, the improvement wherein each of said guides has a base surface facing said endless belts which is formed on a fixed bed with a wavelike longitudinal cross section with a plurality of wave troughs and crests and a plurality of lateral supporting members attached to said beds, wherein said wave crests of one of said guides are staggered with respect to said wave crests of the other of said guides and opposite said wave troughs of said other of said guides and said endless belts are either elastic in the transport direction or a belt storage unit engages each of said endless belts, at least one heating device acting on an edge of said article alongside said guides to melt said coating.

2. The improvement defined in claim 1 wherein said beds are formed on respective cooling ducts.

3. In a conveying apparatus for a flat article, particularly a cardboard blank, paper sheet or the like, comprising two driven endless belts running over guides positioned opposite each other between which said flat article is clamped during transport through said conveying apparatus, the improvement wherein each of said guides has a base surface facing said endless belts which is formed on a bed with a wavelike longitudinal cross section with a plurality of wave troughs and crests and a plurality of lateral supporting members attached to said beds, wherein said wave crests of one of said guides are staggered with respect to said wave crests of the other of said guides and opposite said wave troughs of said other of said guides and said endless belts are either elastic in the transport direction or a belt storage unit engages each of said endless belts, said beds being formed on respective cooling ducts, at least one heating device acting on an edge of said article alongside said guides.

4. In a conveying apparatus for a flat article, particularly a cardboard blank, paper sheet or the like, comprising two driven endless belts running over guides positioned opposite each other between which said flat article is clamped during transport through said conveying apparatus, the improvement wherein each of said guides has a base surface facing said endless belts which is formed on a bed with a wavelike longitudinal cross section with a plurality of wave troughs and crests and a plurality of lateral supporting members attached to said beds, wherein said wave crests of one of said guides are staggered with respect to said wave crests of the other of said guides and opposite said wave troughs of said other of said guides and said endless belts are either elastic in the transport direction or a belt storage unit engages each of said endless belts, said beds being formed on respective cooling ducts, said guides and belts forming a unit and two such units being provided in transversely spaced parallel relation to grip said article jointly.

5. A conveying apparatus according to claim 4 wherein one of said endless belts is elastic in the conveying direction.

6. A conveying apparatus according to claim 4 wherein a slack-takeup unit engages one of said endless belts.

7. In an apparatus for the displacement of sheet material along a path past a processing station, the improvement which comprises a conveyor assembly including:
a pair of spacedly juxtaposed beds longitudinally extending along said path in a transport direction and having confronting surfaces corrugated in said direction so that alternating crests and troughs of said surfaces extend transversely to said direction, the crests of one of said surfaces being offset in said direction from the crests of the other of said surfaces and opposite troughs of said other surface, said beds being fixed and having ridges along opposite longitudinal edges at least along the lengths of said corrugated surfaces;

a respective endless belt disposed between said ridges along each of said surfaces against the respective bed and braced by said respective bed, stretches of said belts between said beds receiving said sheet material between them and being driven in said direction;

means enabling variation in the lengths of said stretches; and at least one heater laterally of said beds for acting upon sheet material displaced along said path and overhanging the beds.

8. The apparatus defined in claim 7 wherein at least one of said belts is substantially inextensible and the last-mentioned means includes a spring-loaded deflection roller engaging a loop of said one of said belts.

9. The apparatus defined in claim 7 wherein the last-mentioned means is constituted by inherent resilience of at least one of said belts.

10. The apparatus defined in claim 7 wherein said processing station includes means alongside said beds for heating both opposite edges of said sheet material disposed adjacent said path and overhanging said beds.

11. In an apparatus for the displacement of sheet material along a path past a processing station, the improvement which comprises a conveyor assembly including:

a pair of spacedly juxtaposed beds longitudinally extending along said path in a transport direction and having confronting surfaces corrugated in said direction so that alternating crests and troughs of said surfaces extend transversely to said direction, the crests of one of said surfaces being offset in said direction from the crests of the other of said surfaces and opposite troughs of said other surface, said beds having ridges along opposite longitudinal edges at least along the lengths of said corrugated surfaces;

a respective endless belt disposed between said ridges along each of said surfaces against the respective bed and braced by said respective bed, stretches of said belts between said beds receiving said sheet material between them and being driven in said direction;

means enabling variation in the lengths of said stretches, said processing station including means for heating opposite edges of said sheet material disposed adjacent said path and overhanging said beds, each of said beds being provided with a passage transversed by a coolant and in heat exchanging relation with a respective one of said surfaces.

* * * * *